United States Patent [19]

Reed et al.

[11] 4,427,793

[45] Jan. 24, 1984

[54] VINYLBENZYL ALCOHOL POLYMER BEADS AND THERMALLY CROSSLINKED DERIVATIVES THEREOF

[75] Inventors: Samuel F. Reed, Holland, Pa.; David L. Hundermark, Knoxville, Tenn.

[73] Assignee: Rohm and Haas Company, Philadelphia, Pa.

[21] Appl. No.: 464,190

[22] Filed: Feb. 7, 1983

Related U.S. Application Data

[60] Division of Ser. No. 115,861, Jan. 28, 1980, Pat. No. 4,384,095, which is a continuation of Ser. No. 927,225, Jul. 24, 1978, abandoned.

[51] Int. Cl.$^3$ ................................................ C08F 8/32
[52] U.S. Cl. .......................................... 521/32; 521/31
[58] Field of Search ......................... 521/31, 32, 33, 38

Primary Examiner—Paul R. Michl

[57] ABSTRACT

Linear addition polymer beads having repeating units of vinylbenzyl alcohol and at least one other structure different from vinylbenzyl alcohol, wherein the vinylbenzyl alcohol units comprise at least 0.5% by weight of the linear polymer, and thermally crosslinked derivatives thereof. The beads are thermally crosslinked by heating during formation thereof or thereafter in the presence of a free radical initiator, such that benzylic methylene or benzyloxy crosslinks are formed between aromatic rings of the vinylbenzyl alcohol units, and between the vinylbenzyl alcohol units and other active sites in the polymer. The linear addition polymers may be formed directly from vinylbenzyl alcohol monomer and at least one other monomer, or indirectly by hydrolysis of vinylbenzyl chloride during linear polymer formation therefrom. The crosslinked products are useful as adsorbents, hydrogels and as intermediates in the preparation of other adsorbents, ion exchange resins, catalysts and slow release agents.

11 Claims, No Drawings

VINYLBENZYL ALCOHOL POLYMER BEADS AND THERMALLY CROSSLINKED DERIVATIVES THEREOF

This is a division of application Ser. No. 115,861, filed Jan. 28, 1980, U.S. Pat. No. 4,384,095, which is in turn a continuation of application Ser. No. 927,225, filed July 24, 1978 abandoned.

BACKGROUND OF THE INVENTION

This invention relates to linear polymer beads containing repeating units of vinylbenzyl alcohol, thereby having the capability of forming thermally crosslinked resin beads. The invention further relates to such thermally crosslinked beads, methods of preparation, and various uses of the beads including use as adsorbents and as intermediates in the preparation of ion exchange resins.

Resin beads intended for ion exchange and related uses are conventionally crosslinked during the preparation thereof to an extent depending upon the degree of swelling and density desired in the product. For example, ion exchange resins which have been synthesized with low levels of crosslinker are less dense than those which have been made with high levels of crosslinking material. The extent of crosslinking, and therefore swelling and density, controls the selectivity of the resin with respect to species to be adsorbed or exchanged. Crosslinking is evidenced by decreased solubility and decreased swelling of the polymers in solvents.

Commonly, polymers are crosslinked during bead formation by copolymerizing a monoethylenically unsaturated compound with a polyethylenically unsaturated compound, such as the copolymerization of styrene with divinylbenzene. This represents a form of primary crosslinking. Further crosslinking may take place during treatment of a linear polymer to incorporate active sites (to which can be attached ion exchange functional groups, such as occurs upon chloromethylation of styrene polymers or copolymers. The latter form of crosslinking is often termed "secondary crosslinking." Polymer beads may be post-crosslinked by copolymerizing two monoethylenically unsaturated compounds, one of which also contains a group capable of crosslinking by condensation, and then treating with a suitable reagent for reacting with such group. Alternatively, a linear polymer may be formed from a monomer already containing an active site for attachment of an ion exchange group, by reaction under polymerization conditions with a polyfunctional crosslinking agent. U.S. Pat. No. 3,843,566 describes products of the last type, including polyvinylbenzyl chloride crosslinked with divinylbenzene as an intermediate in the preparation of macroreticular (macroporous) ion exchange resins. Such product has the advantage over chloromethylated styrene polymers of substantial absence of secondary crosslinking. Attempts have been made to avoid the use of added crosslinking agents by thermally crosslinking polymers containing at least 38 mole percent of alkyl vinyl aromatic hydrocarbons by heating at temperatures between 240° C. and 260° C. for a time betwen 8 hours and 7 days in the presence of an inert gas. See U.S. Pat. No. 2,987,508.

All of the foregoing crosslinking procedures require steps or other process conditions which complicate the formation of the crosslinked resin bead, either by virtue of need for an added crosslinking agent or by extreme temperature requirements. Such procedure also place limitations on total utilization of all reactants and resin bead properties, such as size uniformity, swelling, and product use.

SUMMARY OF THE INVENTION

It has now been found, in accordance with one aspect of the invention, that the need for an independent polyunsaturated crosslinking monomer may be dispensed with by incorporating vinylbenzyl alcohol units into a linear addition polymer bead wherein the vinylbenzyl alcohol units comprise at least 0.5% by weight of the linear polymer bead, the balance of the repeating structural units comprising at least one other aliphatic or aromatic structure different from vinylbenzyl alcohol. Preferably, a major proportion of the linear polymer comprises such other structure. For preparation of ion exchange resins, about 0.5% to about 20% by weight of vinylbenzyl alcohol units will usually suffice. Crosslinks are formed between aromatic rings of the vinylbenzyl alcohol units, and between the aromatic rings of the vinylbenzyl alcohol groups and other active sites of the linear polymer (such as benzylic carbon atoms of vinylbenzyl chloride units), upon heating the linear polymer to moderate temperatures in the presence of a free radical initiator. The crosslinks comprise benzylic methylene and/or benzyloxy groups between aromatic rings of the vinylbenzyl alcohol units and other active sites in the linear polymer.

In another aspect of the invention, the benzylic methylene crosslinks and/or benzyloxy crosslinks result from heating vinylbenzyl alcohol and another monomer under free radical initiated polymerization conditions at a temperature somewhat higher than conventional in such polymerization. The crosslinking may also be effected by heating linear addition polymer beads containing vinylbenzyl alcohol units after formation of the beads.

In still another aspect of the invention, the vinylbenzyl alcohol units may be formed in situ by hydrolysis of vinylbenzyl chloride units in a monomer mixture containing vinylbenzyl chloride, during formation of a linear addition polymer therefrom, or by hydrolysis of vinylbenzyl chloride units in a linear addition polymer bead form. Benzylic methylene crosslinks and/or benzyloxy crosslinks are thereafter formed between aromatic rings of the vinylbenzyl alcohol units and between such aromatic rings and other active sites upon thermal treatment in the presence of a free radical initiator.

In still other aspects of the invention the degree of hydrolysis, polymerization and/or crosslinking is controlled by temperature, initiator concentration and other variables to obtain products useful for a variety of applications, including use as adsorbents, ion exchange resins of all types, hydrogels, catalysts, slow release agents, and others. The invention also provides a convenient method of reducing product cost while improving uniformity of bead size, by recycling particle fines, oversized particles, and non-uniform beads back into the linear polymer preparation step.

DETAILED DESCRIPTION

The linear polymers of this invention are in bead or pearl form, that is spheres having a particle diameter ranging from about 0.02 mm. to about 2 mm., preferably about 0.2 mm. to about 1 mm. The bead character thus distinguishes the products from the far smaller particle size of the latex particles present in resinous coating compositions, such as the curable polymer compositions of U.S. Pat. No. 3,879,328. Moreover, although the latter patent describes polymers prepared with vinylbenzyl alcohol monomers, the crosslinking thereof is through an ionic mechanism utilizing an acid catalyst, whereby the hydroxyl groups of the vinylbenzyl alcohol units form ether crosslinks and/or methylene crosslinks between aromatic rings (alkylation of aromatic rings) rather than the benzylic methylene and/or benzyloxy crosslinks obtained by the thermal, free radical initiated crosslinking of the present invention.

The method of preparation selected for the linear polymer beads of the invention determines the compositional character of the products. In the simplest case, vinylbenzyl chloride is polymerized in an aqueous medium in accordance with known polymerization techniques utilizing a free radical catalyst, the polymerization being accompanied by limited hydrolysis of the chloromethyl groups. Standard bead forming suspension polymerization, for example, is effected at about 55°-75°, preferably about 65° C., for about 20 to 40 hours, resulting in formation of a linear polymer bead product containing about 1-5% by weight of vinylbenzyl alcohol units. If the pH is adjusted to the alkaline side, for example about 10-12, the hydrolysis proceeds further. Hydrolysis to an even greater extent is achieved by multi-stage polymerization wherein polymerization is effected at about 50° C. for about 5-10 hours at pH of about 10.5, followed by polymerization at a higher temperature, about 60°-70° C., for about 20 hours. the temperature and duration of polymerization depend, of course, upon the decomposition temperature of the free radical initiator and its concentration, higher polymerization temperatures being selected if the decomposition temperature of the initiator is higher, and vice versa. As indicated, hydrolysis can be increased also by maintaining the pH of the polymerization mixture on the alkaline side, as by the addition of more bases (since the initially added base is usually consumed during the polymerization). For the dependence of hydrolysis of benzyl chloride groups upon pH see the paper to Tanalee and Sano in Catalysis, 10 (2), 173 (1962).

When starting with vinylbenzyl chloride and hydrolyzing in situ, hydrolysis may be controlled such that from about 0.5 to about 20% by weight of the linear polymer comprises vinylbenzyl alcohol units. While in theory hydrolysis could proceed to an even greater extent, there is no practical reason for hydrolyzing to more than about 20% by weight, and as a general rule hydrolysis to the extent of about 1-5% by weight is adequate for most uses of the linear polymers.

While the foregoing in situ hydrolysis and polymerization results in linear polymers containing vinylbenzyl alcohol and vinylbenzyl chloride units, one or more other monomers may also be included in the polymerization mixture. These monomers may be any alpha, beta-monoethylenically unsaturated monomers known to be useful for the formation of ion exchange resins and adsorbents. Examples of such monomers include vinyl esters ($C_1$-$C_{18}$) aliphatic acids such as vinyl acetate, laurate, and stearate; esters of acrylic acid or methacrylic acid with ($C_1$-$C_{18}$) alcohols, including ($C_1$-$C_{18}$) alkanols, benzyl alcohol, cyclohexyl alcohol, and isobornyl alcohol, such as butylacrylate or methacrylate, 2-ethylhexylacrylate or methacrylate, octadecylacrylate or methacrylate; a vinyl aromatic hydrocarbon such as styrene, vinyl toluene, isopropenyl toluene, and various dialkyl styrene; nitriles such as acrylonitrile, methacrylonitrile, ethacrylonitrile and phenylacrylonitrile; acrylamide, methacrylamide and ethacrylamide; N-methylol acrylamide, N-monoalkyl and -dialkyl acrylamide and methacrylamides such as N-monomethyl, -ethyl, -propyl, -butyl, and N-dimethyl, -ethyl, -propyl, and -butyl alkacrylamides; N-monophenyl and -diphenyl, -acrylamides and -methacrylamides; vinyl ethers such as butyl vinyl ethers; N-vinyllactams such as N-vinylpyrrolidone; itaconic diesters containing a single $CH_2=<$ grouping, e.g., dimethyl, diethyl, dipropyl, dibutyl and other saturated aliphatic monohydric alcohol diesters of itaconic acid, and aromatic diesters such as diphenyl itaconate and di(phenylethyl) itaconate; allyl and methallyl esters of saturated aliphatic monocarboxylic acids, such as allyl and methallyl acetates, allyl and methallyl propionates, and allyl and methallyl valerates; vinyl thiophenes; various N-vinyl heterocyclics such as the 2-vinyl and 4-vinyl pyridines and alkylated vinyl pyridines and the like. Such comonomers may be used singly or in any combinations with vinylbenzyl chloride in any proportions which will provide the desired degree of hydrolysis for thermal crosslinking purposes.

In another route to the linear addition polymers, vinylbenzyl alcohol monomer may be copolymerized with at least one other monomer different from vinylbenzyl alcohol under bead forming conditions, wherein the vinylbenzyl alcohol comprises about 0.5 to about 20% by weight of the monomer mixture, the balance being the comonomer. The comonomers may be any of the comonomers described above, and may be used singly or as mixtures.

For preparation of linear polymer beads which are to be used for ion exchange, monomers will be selected, of course, which enable the crosslinked polymer to be used immediately for ion exchange or to serve as an intermediate which can be modified to contain ion exchange funtionality. Vinylbenzyl chloride is a preferred monomer of the latter class since it is easily aminated in a known manner to form an anion exchange resin of the strong base or weak base types. A resin having immediately utility as a cation exchange resin of the weak acid type may be formed by utilizing a comonomer having carboxyl functionality. Still further, hydrocarbon comonomers may be utilized and strongly acidic ion exchange resins prepared therefrom by sulfonation or phosphorylation. The vinylbenzyl alcohol/hydrocarbon monomer copolymer beads, after thermal crosslinking, may also be chloromethylated and then functionalized to weakly or strongly basic anion exchange resins, in a known manner.

In the case of linear polymers prepared from vinylbenzyl alcohol and comonomers, an aqueous polymerization system is not required although aqueous systems are more convenient from the standpoint of bead formation. For example, linear polymers may be prepared by bulk or solution polymerization techniques, followed by precipitation of the polymers in bead form and thermal crosslinking. Inverse suspension polymerization techniques may also be utilized in forming the linear polymers, followed by the thermal crosslinking. In the latter case a water soluble comonomer is utilized and the organic phase is a mineral oil or other hydrocarbon. While emulsion polymerization techniques may also be used, suspension polymerization is preferred if larger diameter beads are desired. The molecular weight of the linear polymer is controllable by concentration of the free radical initiator, as is well known.

Other conditions of the polymerization are standard in the art, including the use of specialized additives. These include gelatin as a colloidal stabilizer when the pH of the polymerization is maintained at about 8. Other stabilizers do not require pH control, such as magnesium silicate. The alkalinity of the polymerization reaction mixture may be obtained and adjusted by additions of a suitable base or buffering compound. In the preferred polymerization technique (suspension polymerization), the polymerization medium is aqueous and a suspending or a dispersing agent is present, such as carboxymethylcellulose, bentonite, polyvinylamidazone, or poly(diallyl dimethyl ammonium chloride).

The linear polymers may be thermally crosslinked in a variety of ways, all requiring heating in the presence of a free radical initiator. In one technique the linear addition polymer is separated from the reaction mixture, dried, and heated in a vacuum oven at about 95° C. for several hours, e.g., 2–8 hours. Alternatively, the linear polymer may be heated in the aqueous dispersion resulting from the linear polymerization (or the polymer may be separated and then redispersed in an inert solvent such as water or isooctane) to temperatures in the range of about 65° C. to about 95° C. for about 5 to 15 days. The linear polymer may also be thermally crosslinked during the initial linear polymerization by carrying out the polymerization at temperatures somewhat elevated above standard polymerization temperatures, for example, at temperatures above about 70° C., preferably at least about 80° C. Optimum temperatures, of course, will depend on the decomposition temperature of the free radical initiator and may be selected accordingly. Crosslinking is evidenced by substantial insolubility of the product in standard solvents, such as ethylene dichloride and toluene, and by lower swelling of the products in ethylene dichloride or toluene. The degree of crosslinking increases with molecular weight of the linear polymers and the proportion of vinylbenzyl alcohol units in the linear polymers. Crosslinking is also increased by higher treating temperatures and longer heating times. However, no appreciable increase in crosslinking is noted after about 15 days heating at 60°–95° C. of polymers having moderately high molecular weights, when using a common free radical initiator. Comparable crosslinking is effected in the higher molecular weight linear polymers at the same temperatures but for shorter periods of time.

In general, desirable degrees of crosslinking are achieved by heating linear polymers during or after bead formation at temperatures of about 55° C. to about 80° C. or higher (e.g., at reflux temperature) for two hours up to about 15 days or more, the limits being variable depending on the initiator concentration, the molecular weight of the polymers, the solvent system, and the proportion of vinylbenzyl alcohol units in the polymer. For preparation of most ion exchange resins, low degrees of crosslinking are sufficient, based upon about 1–5 weight percent of vinylbenzyl alcohol units in the linear polymer. The term "lightly crosslinked" as used in this specification means polymers thermally crosslinked as a consequence of containing 0.5% to about 20% by weight of vinylbenzyl alcohol units in the linear polymer. The lightly crosslinked resin beads are preferred for most end uses of the polymers of the invention.

Any free radical initiator effective for addition polymerizations may be used to produce the crosslinked products of the invention. These include peroxides, hydroperoxides, percarbonates, azo compounds and the like, of which the following are representative: benzoyl peroxide, tertiary-butyl hydroperoxide, cumene peroxide, tetralene peroxide, acetyl peroxide, caproyl peroxide, tertiary butyl perbenzoate, tertiary butyl diperphthalate, methylethyl ketone peroxide. Mixtures of the initiators may be used. Somewhat more than the usual amount of initiator for linear polymerizations is required for effective thermal crosslinking but optimum amounts will depend upon the proportion of vinylbenzyl alcohol units in the linear polymer, the molecular weight of the linear polymer, and other conditions such as heating temperature and duration, and the reaction medium. Certain reaction medium solvents are known to enhance free radical initiation by forming complexes with the initiators, for example, such as benzyl alcohol, as more fully described by Tobolsky and Matlack in J. Chem. Soc., 131 (1951). The complexes often permit polymerization at lower temperatures and/or at lower initiator concentrations.

From about 0.01% to about 5% by weight of a standard initiator based on the weight of linear polymer, is a useful range, about 0.5% to about 2% by weight being preferred. An appropriate concentration of initiator may be provided by employing an excess of initiator in the linear polymerization, such that sufficient unused initiator will be available for the thermal crosslinking.

As indicated above, the thermal crosslinking results in benzylic methylene and/or benzyloxy crosslinks between the aromatic rings of the vinylbenzyl alcohol units and between such aromatic rings and other active sites. Crosslinking may occur at a variety of sites because of the free radical character of the reaction. With respect to the vinylbenzyl alcohol units the sites include the carbon atom of the alcohol group, the oxygen atom of the alcohol group, and the benzylic carbon atom of the vinyl group forming at least a portion of the backbone of the linear polymer to which the aromatic ring of the vinylbenzyl alcohol units are attached. The variety of crosslinking thus made possible optimizes the crosslinking which may be achieved by a relatively small proportion of vinylbenzyl alcohol units in the linear polymer.

Among the crosslinked structures which may be present in products of the invention are the following, wherein a linear polymer containing vinylbenzyl chloride units and vinylbenzyl alcohol units is used as representative structure:

Ring Attachment:

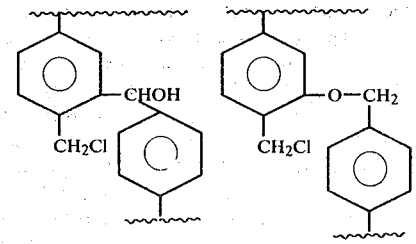

Radical Coupling:

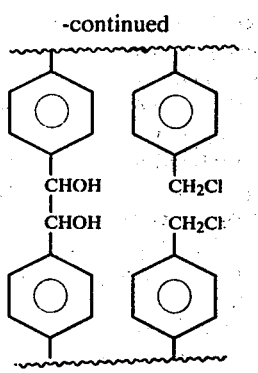

Secondary Crosslinking:

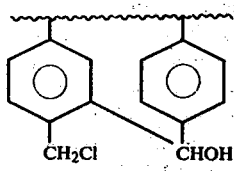

In addition, radical abstraction on a benzylic carbon atom in the polymer backbone chain may occur, affording crosslinking at such point.

In contrast, crosslinking through an ionic mechanism, as in U.S. Pat. No. 3,879,328, results in ether or methylene crosslinks:

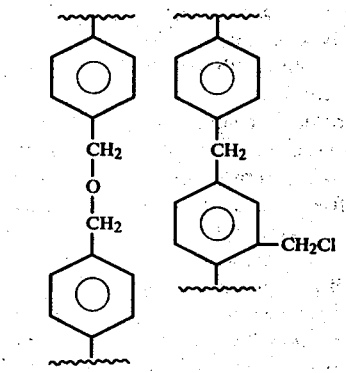

Those crosslinked products of the invention which are based upon resin beads containing low proportions of vinylbenzyl alcohol units, are useful per se as adsorbents and hydrogels, due to their considerable degree of swelling in aqueous media For example, the products derived from vinylbenzyl chloride (which had been hydrolyzed to about 2-3% by weight of vinylbenzyl alcohol) were found to have porosities in a range of 0.3 to 0.8 cc/cc. and the products swelled to a foam-like character and floated. The products were found useful as oil adsorbents and therefore, can be used for oil spill clean-up.

The products are also useful as substrates or intermediates for preparation of a wide variety of ion exchange copolymers and resins (gels, macroreticular, and hybrids, as defined in U.S. Pat. No. 3,991,017) and slow release agents. In the latter case, the crosslinked polymers or appropriately functionalized derivatives may serve as the host substrate for filling with guest chemicals whose slow release is desired. For example, organic solvent solutions of agricultural chemicals (such as herbicides and insecticides), drugs, deodorants, catalysts, and other reactive compounds, can readily be imbibed into the polymers and the composite product maintained in a solvent medium until release is desired. Release is then effected by removal of the solvent medium. In those cases where the thermally crosslinked resin beads contain reactive groups, such as chloromethyl groups, guest compounds can be chemically attached to prepare products possessing even slower release than available when the guest material is only physically incorporated into the crosslinked polymer.

Based on the ability of certain of the thermally crosslinked polymers of the invention to absorb and retain water in large amounts (on the order of about 20-98% by weight of the polymer), the polymers are useful as hydrogels, particularly when functionalized with ionic groups such as amino or acid groups such as carboxyl or sulphonic acid, or when functionalized with organic hydrophilic groups such as hydroxyl or amido. Hydrogels are useful in coatings of various types, such as friction reducing marine coatings, and in a wide variety of shaped articles for medical, household and industrial uses, such as tobacco smoke filters, body implants and non-migratory humectants. See, for example, U.S. Pat. No. 4,060,678.

Anion exchange resins are easily prepared from those thermally crosslinked resin beads of the invention which contain appropriate reactive sites (such as the chloro groups of vinylbenzyl chloride or chloromethyl ether groups). Typically, the anion exchange resin preparation is an aminolysis reaction as follows, where x is the number of units in the polymer backbone; R is hydrogen, alkyl ($C_1$-$C_8$ or higher, substituted or unsubstituted), acyl (substituted or unsubstituted), alkyl, or substituted alkaryl; $R^1$ and $R^2$ independently are alkyl ($C_1$-$C_8$ or higher, substituted or unsubstituted), aryl (substituted, such as alkaryl, or unsubstituted), cycloalkyl, or cycloalkenyl; and $R^1$, $R^2$ and $R^3$ independently may be heterocyclic groups or any two of $R^1$, $R^2$ and $R^3$ may form heterocyclic groups with the nitrogen atom to which they are attached:

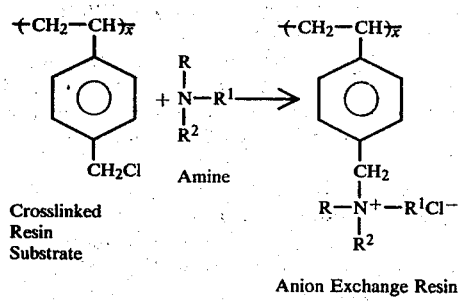

Anion Exchange Resin

Although the amines used for the aminolysis are more commonly secondary or tertiary aliphatic monoamines (to obtain weak base or strong base resins, respectively) such as dimethylamine and trimethylamine, polyamines are also useful, including aliphatic, aromatic and heterocyclic polyamines containing any combination of primary, secondary and tertiary amino groups. The polyamines, in addition to providing ion exchange sites, also provide additional crosslinking and thereby alter pore size distribution and other properties. Typical polyamines are piperazine, xylene diamine and diethylene triamine. An alkaline catalyst such as sodium carbonate is conventionally used in such reactions.

Typically, the aminolysis reaction is carried out using a non-aqueous solvent system employing ethylene dichloride as swelling solvent and methanol as the major reaction medium. The ratio of combined solvents to polymer substrate is generally high because of the unusual swelling character of the polymer. Otherwise, conditions of aminolysis are conventional. The amine is employed in a molar excess. Reaction times of about 3–12 hours at about 60°–65° C. are satisfactory. Other aminolysis techniques are also useful. These include aqueous aminolysis with water-soluble amines or reactions in mass with the amine. Anion exchange resin isolation is carried out in the usual manner, as by filtration, methanol washing, deionized water washing, azeotropic distillation of residual organics (mainly ethylene dichloride), and further washing with deionized water. The resins may be oven dried at 150° C. over periods ranging from about 1 to 4 days.

The anion ion exchange resins exhibit varying degrees of swelling in water depending upon the extent of thermal crosslinking of the substrate, the specific amine employed in the resin formation, aminolysis conditions, whether weak or strong base resin (usually weak base resins swell to lesser extents than strong base resins because of the additional crosslinking which takes place in the amine-forming reaction), and the pH of the aqueous phase. Extremes of swelling may vary approximately 100–150 ml/ml dry resin, depending upon a combination of the above factors. Common swelling levels observed are about 5–90 ml/ml dry resin in deionized water (pH about 6.5).

The preparation of specific types of anion exchange resins from certain thermally crosslinked polymers of the invention is described in commonly assigned copending U.S. applications Ser. Nos. 927,196, now U.S. Pat. No. 4,191,814 and 927,195, now U.S. Pat. No. 4,192,920, filed simultaneously with the grandparent of the present application.

Thermally crosslinked polymers of the invention are also useful as the host phase in the preparation of hybrid copolymers for ion exchange resin formation wherein the filler or guest phase is styrene, divinylbenzene, vinylbenzyl chloride, methylacrylate, or other alpha,beta-ethylenically unsaturated monomers, both monoethylenically and polyethylenically unsaturated. Certain of the hybrid copolymers when suitably functionalized provide thermally regenerable ion exchange resins. U.S. Pat. Nos. 3,991,017 and 3,966,489 describes preparative techniques for such hybrid copolymers and uses.

Macroreticular adsorbents and ion exchange resins are readily prepared in accordance with the invention by utilizing a phase extender (precipitant) in the polymerization mixture during formation of the linear polymer beads containing the vinylbenzyl alcohol units. Suitable phase extenders or precipitants are alkanols containing 4–10 carbon atoms, such as 2-ethylhexanol and methyl isobutyl carbinol, and aliphatic hydrocarbons containing at least 7 carbon atoms, such as heptane and isooctane. The amount of precipitant may vary from about 10% to about 80% by weight of the mixture of monomer and precipitant. The phase extender or precipitant is removed during the thermal crosslinking of the linear polymer, as by steam distillation or simple heating. The macroreticular, thermally crosslinked resin may then be aminated to form anion exchange resins or otherwise reacted in known ways to produce ion exchange resins. The foregoing and other conditions for formation of macroreticular adsorbents and ion exchange resins, except for thermal crosslinking in accordance with the present invention, are further described in U.S. Pat. Nos. 3,037,052 and 3,843,566.

The thermally crosslinked products of the invention are lightly crosslinked and therefore are also useful as intermediates in the preparation of polymeric adsorbents and ion exchange resins of the macronet type. These adsorbents and resins have high surface area (about 100–1400 $m^2/g$.) and high porosity (about 0.3–0.7 cc/cc) and therefore are useful substitutes for activated carbon and polymeric adsorbents commercially available in a variety of applications including water treatment, separation of organic materials from gaseous and other streams, pharmaceutical purification and processing, and catalysis. Macronet adsorbents are characterized by crosslinks which are stable and have a long and rigid structure, resulting from postcrosslinking a lightly crosslinked polymer while in a highly swollen state. The swollen state causes displacement of the polymer chains at significant distances from each other and the postcrosslinking renders such displacement permanent. The term "macronet" has been used to describe the ion exchange functionalized polystyrene and styrene-divinylbenzene copolymer macromolecules obtained by crosslinking linear polystyrene in solution or styrene polymers in the swollen state by reaction with an alkylating agent under Friedel-Crafts conditions, as described in U.S. Pat. No. 3,729,457 and in related articles in The Journal of Polymer Science, Symposium No. 47, pages 95–101 and 189–195 (1974). Similar ion exchange resin products are disclosed in British Pat. No. 1,095,746 wherein polystyrene or a styrene derivative in a swollen pearl form undergoes crosslinking by acylation under Friedel-Crafts conditions.

In preparing macronet adsorbents (and ion exchange resins therefrom) from the thermally crosslinked vinylbenzyl alcohol polymers of the invention, several techniques can be used. In all of these techniques the starting thermally crosslinked polymer may be a gel-type or macroreticular-type polymer, the latter being preferred.

In one technique, the thermally crosslinked polymer is swollen in a suitable organic solvent and while the polymer is in the swollen state in the solvent a Friedel-Crafts catalyst and a crosslinking agent are added. The reaction mixture is then heated to about 40°–100° C. or higher (the upper limit depending on the boiling point of the solvent) for about 1–24 hours to effect post-crosslinking. Other reaction times may be used, depending upon the reactive species and catalyst in the reaction mixture. Following reaction, the reaction mixture is quenched with water or a lower alkanol such as methanol, or acetone, or by inverse aqueous quenching, and the macronet polymer beads separated by thorough washing with suitable solvents, and dried.

A variety of solvents and solvent mixtures may be used to swell the substrate polymer, including chlorinated hydrocarbons such as chlorobenzene, ethylene dichloride, perchloroethylene, propylene dichloride, and dichlorobenzene; aliphatic hydrocarbons, such as hexane isooctane and petroleum ether; nitro paraffins such as nitro propane; nitro aromatics such as nitro benzene; and miscellaneous solvents such as carbon disulfide. Ethylene dichloride is the preferred solvent.

Friedel-Crafts polyfunctional alkylating agents are the preferred crosslinking agents but useful macronet adsorbents are also prepared with Fiedel-Crafts polyfunctional acylating agents and with sulfur halides. The polyfunctional alkylating agents include polyhalides, polyols and polyolefins, such as alpha,alpha-dichloro-p-xylene, polyvinyl chloride, methylene chloride, chloromethyl methyl ether, bis(chloromethyl)benzene, bis 1,4-chloromethyl biphenyl, bis(chloromethyl)thiophene, 1,4-dichlorohexane, 1,4-dichlorobutane, chloroform, carbon tetrachloride, paraldehyde, alkylene glycols such as ethylene glycol, diepoxides, polybutadienes, and the like. It will be apparent that the alkylating agents may contain aromatic groups provided the atoms of the alkylating agents which bond to the macroreticular polymer are aliphatic carbon atoms.

The difunctional acylating agents preferably are aromatic compounds but also include aliphatic compounds. Generally, the acylating agents are diacid chlorides although polyesters and polyamides are also useful. In the case of the aromatic diacid chlorides, the carbonyl groups must be separated by at least one carbon atom. For example, while suitable aromatic diacid chlorides includes terephthaloyl chloride and isophthaloyl chloride, ortho-phthaloyl chloride would not be suitable since it tends to form anthraquinone rings which in turn participate in redox reactions.

Other suitable acylating agents include 1,4-naphthoyl dichloride, 1,5-naphthoyl dichloride, 1,6-naphthoyl dichloride, anthracene-1,5-diacid chloride, anthracene-1,9-diacid chloride, chlorofumaric acid, dichloromaleic acid, and the dichlorides of malonic, succinic, adipic and sebacic acids. Still other acylating agents include phosgene and thiophosgene. The sulfur halide crosslinkers include inorganic compounds which are liquids under the reaction conditions, such as sulfur monochloride, sulfur dichloride and the corresponding bromides.

Any Friedel-Crafts type catalyst may be utilized to catalyze the reaction, such as the acidic metal halides, including aluminum chloride, stannic chloride (preferred), aluminum bromide, boron fluoride, zinc chloride, ferric chloride, and the like. The swelling solvent and the solvent selected for the reaction medium, if an additional solvent is used, may be the same or different but should be solvents which will not deactivate the Friedel-Crafts catalyst. The swelling solvents set forth above have this character. From about 0.001% to about 5% by weight of catalyst based on polymeric substrate will be effective, but the optimum amount of catalyst will depend upon the reactants and conditions of the reaction.

The crosslinking agent added to the reaction mixture containing the swollen, lightly crosslinked polymer causes, in the presence of the Friedel-Crafts catalyst, external (sometimes called "secondary") crosslinking. However, the Friedel-Crafts catalyst itself causes methylene crosslinking by reaction with the chloromethyl groups of the substrate polymer. Accordingly, the second technique for macronet formation comprises merely adding a Lewis acid catalyst to the solvent mixture containing the swollen, thermally crosslinked vinylbenzyl alcohol polymer and heating as required to post-crosslink by formation of internal crosslinks, i.e., methylene bridges (sometimes also called "primary" crosslinking).

The Friedel-Crafts type Lewis acid catalysts previously mentioned appear to give the best results in this second route to macronet formation adsorbents but useful products are also prepared with other Lewis acids, including strong oxy acids such as perchloric acid, strong halogen acids such as hydrofluoric and $HBF_4$ acids, and acidic sulfonating agents of which sulfuric acid, oleum, sulfur trioxide, chlorosulfonic acid and fluorosulfonic acid are representative. The amount of Lewis acid (acidic sulfonating agent or Friedel-Crafts catalyst) will be about the same as described above when used without an external crosslinker, the optimum amount depending of course upon the reactants and conditions of the reaction.

The reaction with the Friedel-Crafts or other type Lewis acid provides essentially the same form of crosslinks; however, some sulfonation of the copolymer substrate aromatic groups will occur when an acidic sulfonating crosslinker is used, thereby making these macronet adsorbents useful as cation exchange resins as well as adsorbents. In the latter case, it will be recognized that if the sulfonating agent is chlorosulfonic acid, the macronet adsorbent must first by hydrolyzed in the conventional manner (as by treatment with 4% aqueous sodium hydroxide—see U.S. Pat. No. 3,972,840). In any case the resulting macronet adsorbents contain residual chloromethyl groups, enabling the products to be easily converted to anion exchange resins or amphoteric ion exchange resins in the conventional manner.

The macronet adsorbents may be converted to ion exchange resins by known techniques. For example, the adsorbents may be converted to weak base resins by chloromethylation (if not based on vinylbenzyl chloride) and then aminolysis with dimethylamine, or to strong base resins by chloromethylation (if required) and then amination with trialkyl amines such as trimethylamine. Likewise, certain of the adsorbents may be converted to acidic cation exchange resins by sulfonation or phosphorylation. It will be understood that the more highly crosslinked the macronets the less useful are they as intermediates for ion exchange resin formation. However, if the crosslinking agents are aromatic or otherwise provide bulky crosslinks, the macronets products may still exhibit good ion exchange capacity upon functionalization to ion exchange form, even though highly crosslinked. Accordingly, a balance is required between crosslinking density and crosslink bulk for use of the macronets in ion exchange resin formation. Functionalizing of polymeric adsorbents to form ion exchange resins is well-known and therefore requires no further elaboration. The patents listed above provide good description of ion exchange resin formation.

The macronet adsorbents may also be used as substrates for the formation of hybrid copolymers and ion exchange resins in accordance with U.S. Pat. No. 3,991,017. Briefly, in forming hybrid copolymers and ion exchange resins, a liquid monomer mixture containing a crosslinking monomer is added to an aqueous suspension of the macronet adsorbent, which liquid monomer mixture is imbibed into the pores of the macronet adsorbent and is polymerized therein. The resulting hybrid product may then be converted to an ion exchange resin by appropriate functionalization in the conventional manner. If the macronet adsorbent and/or the imbibed monomer mixture contains a carboxylic acid containing monomer, the resulting hybrid product may be converted to an amphoteric ion exchange resin by aminolysis and hydrolysis.

It is thus evident that a wide variety of adsorbents and ion exchange resins may be produced in accordance with the invention. By selection of monomers, swelling solvents, crosslinking agents and Friedel-Crafts alkylating or acylating agents, polymers can be obtained having a wide range and balance of surface area, porisity, pore size, pore distribution, physical stability and particle size. Such properties make the products suitable for liquid and gas phase separations and various other adsorbent and ion exchange applications. These include adsorption of organic materials such as phenol, carbon tetrachloride, hexane, cumene, and methyl chloroform.

The following examples further illustrate the invention, it being understood that the examples do not necessarily limit the scope of the invention and that various other modifications are equivalent for the stated and illustrated functions without departing from the spirit and scope of the invention. Throughout the specification and claims all parts and percentages are by weight unless otherwise indicated.

EXAMPLE 1

A. Preparation of Linear Poly(Vinylbenzyl Chloride) Suspension Polymer

To a 3 liter, 4 necked flask fitted with a mechanical stirrer, reflux condenser, thermometer, nitrogen inlet, heating mantel, and thermowatch assembly was charged a premixed aqueous phase composed of 950 ml. deionized water, 1.2 g. boric acid, 40 g. PADMAC [poly(diallyldimethylammonium chloride)], 0.3 g. sodium nitrite, and 4.4 g. Pharmagel (trademark) gelatine protective colloid. The pH of the aqueous phase had been adjusted to 10.5 using 50% sodium hydroxide. Nitrogen flow was started and the stirring rate was set at 135 rpm. A premixed organic phase of 790 g. vinylbenzyl chloride and 15.8 g. benzoyl peroxide (2%) was added, the suspension formed by on-off cycling (2 mins. on, 1 min. off), and the mixture heated to 60° C. for 20 hours. On cooling, the polymeric product was isolated, washed thoroughly with water, and air dried. Yield was 781 g. The polymer was readily soluble in common solvents such as ethylene dichloride and toluene and therefore was linear. Analysis for chloride in the aqueous phase indicated 3.1% by weight conversion of vinylbenzyl chloride to vinylbenzyl alcohol units in the polymer.

B. Preparation of Thermally Crosslinked Poly(vinylbenzyl Chloride)

A portion of the linear polymer of Part A (200 g.) containing a substantial residue of benzoyl peroxide initiator was placed in a vacuum oven at 95° C. for a period of 48 hours. Upon cooling, the polymer weight was 19.7 g. The polymer did not dissolve in ethylene dichloride or toluene; however, it did swell to appreciable levels, i.e., the swelling ratio in ethylene dichloride was about 9.5/1.

EXAMPLE 2

Example 1 was repeated in all essential respects except for use of 7.9 g. (1 wt. %) benzoyl peroxide initiator. A quantitative yield of linear polymer was isolated and the linear polymer was thereafter thermally crosslinked as described in Example 1B.

Table I reports the relative extents of crosslinking of polymer bead samples prepared as in Example 2, except for different heating temperatures and times, as determined by solvent swelling in ethylene dichloride (EDC) or toluene and by solvent extraction measurements using EDC. Chlorine analysis is included to show that chlorine (vinylbenzyl chloride) content remains substantially unchanged during the crosslinking. In the swelling experiments a 5.0+0.2 ml. sample (3.5±0.3 g) was placed in a 100 ml. graduated cylinder and 80-95 ml. of solvent added. After standing 24 hours (minimum) the swollen volume (ml.) was recorded as ml. per gram of sample. In the extraction experiments, 5 g. samples were treated with 300 ml. EDC at reflux for 1 hour. The solvent was then removed, each sample washed with fresh EDC, and then dried. The sample was reweighed to determine loss in weight due to the EDC extraction and reported as % extracted. It will be noted that increased heating times and/or temperatures increased the crosslinking, as confirmed both by less swelling and lower extractables under the more extreme conditions.

TABLE I

| Sample | Heating Time (Days) | Dry Volume (ml) | Solvent Swelling EDC | | | Solvent Swelling Toluene | | | Solvent Extraction (EDC) | | | % Cl |
|---|---|---|---|---|---|---|---|---|---|---|---|---|
| | | | Weight (g) | Swollen Volume (ml) | ml/g | Weight (g) | Swollen Volume (ml) | ml/g | Initial Weight (g) | Final Weight (g) | % Extracted | |
| A | 1 | 5 | 3.59 | 48 | 13.37 | 3.52 | 31 | 8.72 | | | | 21.73 |
| B | 1 | 5 | 3.66 | 48 | 13.11 | 3.55 | 32 | 9.01 | 5.39 | 4.92 | 8.72 | |
| C | 2 | 5 | 3.64 | 39 | 10.71 | 3.65 | 30 | 8.22 | 4.90 | 4.52 | 7.76 | 21.69 |
| D | 2 | 5 | 3.65 | 39 | 10.68 | 3.63 | 29 | 8.00 | | | | |
| E | 3 | 5 | 3.58 | 39 | 10.89 | 3.44 | 25 | 7.27 | 5.34 | 5.02 | 5.99 | 21.68 |
| F | 3 | 5 | 3.66 | 35 | 9.56 | 3.50 | 25 | 7.14 | | | | |
| G | 5 | 5 | 3.62 | 29 | 8.01 | 3.68 | 23 | 6.25 | | | | 21.63 |
| H | 5 | 5 | 3.64 | 28 | 7.69 | 3.69 | 22 | 6.32 | 5.00 | 4.90 | 2.00 | |
| I | 7 | 5 | 3.57 | 30 | 8.40 | 3.48 | 19 | 5.46 | | | | 21.62 |
| J | 7 | 5 | 3.36 | 25 | 7.44 | 3.39 | 18 | 5.31 | 5.05 | 5.01 | 0.79 | |
| K | 10 | 5 | 3.60 | 24 | 6.66 | 3.36 | 19 | 5.65 | 5.92 | 5.86 | 0.68 | 21.15 |
| L | 10 | 5 | 3.62 | 25 | 6.90 | 3.56 | 19 | 5.30 | | | | |
| M | 14 | 5 | 3.55 | 23 | 6.48 | 3.58 | 18 | 5.03 | | | | 21.32 |
| N | 14 | 5 | 3.60 | 23 | 6.39 | 3.63 | 17 | 4.68 | 5.11 | 5.09 | 0.39 | |

EXAMPLE 3

Example 1 was repeated in all essential respects except for use of 3.95 g. (0.5 wt. %) benzoyl peroxide initiator. A quantitative yield of linear polymer was obtained and the linear polymer was thereafter thermally crosslinked as described in Example 1B.

EXAMPLE 4

Example 1 was repeated in all essential respects except for use of 7.9 g Percadox (trademark) 16 percarbonate initiator and a polymerization temperature of 55° C. The linear polymer was thermally crosslinked as described in Example 1B.

EXAMPLE 5

Example 1 was repeated in all essential respects except that 3.95 g. Percadox 16 percarbonate initiator and 2.99 g. benzoyl peroxide were used as initiators and the polymerization temperature was 55° C. The polymer was thereafter thermally crosslinked as described in Example 1B.

EXAMPLE 6

Example 3 was repeated with the exception that no pH adjustment of the aqueous phase was made prior to polymerization. Thermal crosslinking occurs to a lesser extent than in Examples 1–5.

EXAMPLE 7

Thermal Crosslinking of Linear Suspension Polymers

The following summarizes various methods for thermally crosslinking.

A. Air-Dried Polymers Thermally Treated in Vacuum Ovens

Small samples of polymer (about 10–15 g.) prepared as in Example 1A above were placed in glass bottles and heated in vacuum ovens at 60° C. for varying lengths of time up to 15 days. On cooling, the samples were checked for solubility, swelling levels in ethylene dichloride and toluene, percent extractables in ethylene dichloride, and analyzed for chlorine content. Higher levels of crosslinking are achieved at higher temperatures and longer heat treatment times.

B. Thermal Treatment in Aqueous Dispersions

Forty grams samples of polymer prepared as in Example 1A above were each dispersed in 500 ml. deionized water and heated to reflux for periods up to 14 days. Small samples were removed at frequent intervals, dried, and checked for solubility and extent of swelling in ethylene dichloride. Crosslinking increased with time of heating as evidenced by lower swelling levels of samples.

C. Thermal Treatment in Suspension

A polymer was prepared as in Example 2 above. Before isolation, the suspension was heated to °0-°C. for a period of 3 hours. The suspension polymer was isolated, air-dried and found to be insoluble in ethylene dichloride.

D. Direct Crosslinking in Suspension Polymerization

Vinylbenzyl chloride monomer was polymerized in suspension as described in Example 2 above except the polymerization temperature was 80° C. The product was isolated, air-dried and found to be insoluble in ethylene dichloride.

EXAMPLE 8

Preparation of Strong Base Anion Exchange Resin

Ethylene dichloride (500 ml) and the thermally crosslinked polymer beads of Example 1B (66.2 g.) were charged to a 12 liter 4 necked flask fitted with a mechanical stirrer, reflux condenser, thermometer, and heating mantel. The polymer beads were permitted to swell 30 minutes. The swelling was followed by the addition of 900 ml methanol and 129.5 g. trimethylamine. The mixture was heated to reflux (about 60°–62° C.) for 4.5 hours. Organics were removed by distillation (60°–100° C.) with concomittant addition of 8 liters of deionized water. A total of 1305 ml. of organic distillate was collected. On cooling, the resin beads of the distillate were filtered and washed thoroughly with deionized water. Analysis of beads: %N=5.25, % Cl=14.47, % solids=about 2.0, total anion exchange capacity (TAEC)=4.47 meq/g., swelling in deionized water=80 ml./g.

EXAMPLE 9

Preparation of Weak Base Anion Exchange Resin

Example 8 was repeated in all essential respects except for use of 50 g. of the thermally crosslinked polymer of Example 1B, 300 ml. ethylene dichloride, 500 ml. methanol, 100 g. dimethylamine in place of trimethylamine and heating at reflux for 4 hours. Analysis of resin beads: %N=5.74, % Cl=4.12, % solids=46.6, total anion exchange capacity (TAEC)=5.15 meq./g., strong base anion exchange capacity=2.28 meq./g., weak base anion exchange capacity (AEC)=2.88 meq./g., swelling in deionized water=10.7 ml./g.

EXAMPLES 10–25

Table II below summarizes preparative conditions for other weak base and strong base ion exchange resins of the invention, prepared from thermally crosslinked polymers substantially as described in Examples 8 and 9. The preparation of the thermally crosslinked linear polymers (TX-PVBC) of Examples 10–14 and 17–24 was substantially as set forth in Example 1 except for use in the linear polymer preparation of 0.5% benzoyl peroxide initiator and polymerization for 25 hours at 65° C. Preparation of the thermally crosslinked polymer of Example 15 was substantially as described in Example 7D except for use in the linear polymer preparation of 0.5 benzoyl peroxide initiator first at 80° C. for 20 hours and then at 95°–100° C. for 8 hours. Preparation of the thermally crosslinked polymer of Example 16 was the same as Example 1 in all essential respects except for use in the linear polymer preparation of 0.5% benzoyl peroxide initiator and polymerization for 20 hours at 65° C.

Table III gives the characterizations of the anion exchange resins prepared under the conditions of Table II. The data illustrates the wide range of properties obtainable by varying preparative conditions. For example, although those resins having swelling values over 10 are not economically useful for most ion exchange purposes, their high swelling makes them useful as slow release agents. Swelling can be reduced by increasing the proportion of vinylbenzyl alcohol in the linear polymer, thereby providing a basis for greater thermal crosslinking.

TABLE II

| Example | AMINE Resin Type | (g.) | TX-PVEC (g.) | EDC (ml.) | CH$_3$OH (ml.) | Reaction Time (Hrs.) | Reaction Temp. (°C.) | Dry Resin Yield (g.) |
|---|---|---|---|---|---|---|---|---|
| | Weak Base Resins | | | | | | | |
| 10 | Dimethyl | 100 | 50 | 300 | 500 | 4 | 60 | 52 |
| 11 | Dibutyl | 100 | 22 | 200 | 300 | 3.5 | 60 | 38.3 |

TABLE II-continued

| Example | AMINE Resin Type | (g.) | TX-PVEC (g.) | EDC (ml.) | CH₃OH (ml.) | Reaction Time (Hrs.) | Reaction Temp. (°C.) | Dry Resin Yield (g.) |
|---|---|---|---|---|---|---|---|---|
| 12 | Benzyl, Methyl | 123.5 | 21.5 | 200 | 480 | 3.5 | 60 | 35.9 |
| 13 | Morpholine | 153.5 | 20 | 200 | 300 | 3.5 | 60 | 32.5 |
| 14 | Imidazole | 70 | 30 | 300 | 400 | 6.0 | 60 | 34.8 |
| Strong Base Resins | | | | | | | | |
| 15 | Trimethyl | 104.5 | 30 | 200 | 480 | 6 | 60 | — |
| 16 | Trimethyl | 70 | 130 | 885 | 1400 | 3.0 | 60 | 162.0 |
| 17 | Trimethyl | 100 | 20.5 | 200 | 300 | 3.5 | 60 | 20.8 |
| 18 | Triethyl | 80 | 50 | 400 | 600 | 3.5 | 60 | 63.3 |
| 19 | Tributyl | 125 | 53 | 400 | 600 | 3.5 | 60 | 75.6 |
| 20 | Dimethyl, Phenyl | 67.5 | 20.7 | 200 | 300 | 3.5 | 60 | 31.5 |
| 21 | Pyridine | 100 | 22.4 | 200 | 300 | 5 | 60 | 32.8 |
| 22 | Dimethyl, 3-Hydroxy-propyl | 110 | 20.7 | 200 | 300 | 5 | 60 | 28.9 |
| 23 | Dimethyl, 2-Hydroxy-propyl | 122 | 22 | 200 | 480 | 3.5 | 60 | 24.8 |
| 24 | Triethanol | 123 | 20 | 200 | ml-dioxane | 8 | 100–103 | 37.7 |
| 25 | Triethanol | 125 | 20.8 | 200 | ml-dioxane | 4 | 60 | 31.3 |

TABLE III

| Example | % N | % Cl | % Solids | TAEC (meq./g.) | Strong Base (meq./g.) | AEC meq./g. | Swelling in Water (Deionized) | | |
|---|---|---|---|---|---|---|---|---|---|
| | | | | | | | Resin Weight (g.) | Swollen Volume (ml.) | Swelling ml/g resin (dry) |
| Weak Base Resins | | | | | | | | | |
| 10 | 5.74 | 4.12 | 46.6 | 5.16 | 2.28 | 2.88 | 0.42 | 4.5 | 10.71 |
| 11 | 4.61 | 11.69 | 22.0 | 3.63 | — | — | 0.57 | 6.5 | 11.40 |
| 12 | 5.11 | 11.80 | 25.7 | 3.97 | 3.40 | 0.57 | 0.69 | 5.0 | 7.25 |
| 13 | 5.29 | 12.56 | 25.0 | 5.97 | 0.39 | 5.58 | 0.71 | 17.5 | 24.64 |
| 14 | 8.03 | 10.13 | 38.1 | — | 2.97 | — | 0.69 | 2.0 | 2.90 |
| Strong Base Resins | | | | | | | | | |
| 15 | 5.06 | 14.06 | 3.0 | — | 2.5 | — | 0.58 | 30 | 51.7 |
| 16 | — | — | 1.8 | — | 4.5 | — | 0.60 | 65 | 108.0 |
| 17 | 6.38 | 14.80 | — | — | 3.00 | — | 0.67 | 89.0 | 132.83 |
| 18 | 4.58 | 11.44 | — | — | — | — | 0.59 | 55.0 | 93.22 |
| 19 | 2.39 | 8.22 | 15.0 | — | 3.00 | — | 0.69 | 9.5 | 13.77 |
| 20 | 4.12 | 11.17 | 7.7 | — | 6.24 | — | 0.74 | 9.0 | 12.16 |
| 21 | 4.99 | 12.82 | 2.0 | — | 5.11 | — | 0.66 | 30.5 | 46.21 |
| 22 | 4.76 | 11.91 | — | — | 2.8 | — | 0.67 | 58.0 | 86.6 |
| 23 | 5.00 | 12.57 | — | — | 3.0 | — | 0.63 | 77.0 | 122.2 |
| 24 | 4.58 | 10.85 | 17.6 | — | 8.24 | — | 0.82 | 8.0 | 9.75 |
| 25 | 4.2 | 11.2 | 17.8 | — | 4.25 | — | 0.6 | 5.5 | 9.01 |

EXAMPLE 26

This example illustrates a method of forming vinylbenzyl alcohol polymers using vinylbenzyl alcohol monomer.

A mixture of 93.4 g. (0.9 mole) styrene, 13.4 g. (0.1 mole) vinylbenzyl alcohol 0.50 g. (0.5%) benzoyl peroxide, and 0.5 g. (0.5%) Percadox-16 initiator is added to a 1 liter, 4-necked flask containing an aqueous phase consisting of 200 ml. deionized water, 0.2 g. boric acid, 10 g. PADMAC, 0.05 g. sodium nitrite, and 0.8 g. Pharmagel gelatine. The pH of the aqueous phase is previously adjusted to 10.0 using 50% sodium hydroxide. Nitrogen flow is started and the stirring rate is set at 146 rpm. The suspension is formed by three on-off cycles (2 mins. on, 1 min. off) and the mixture is heated to 50° C. over a period of twenty hours. On cooling the copolymer particles are isolated and washed thoroughly with deionized water. After air drying, the copolymer is soluble in common solvents such as toluene and ethylene dichloride.

Samples of the above copolymer are heated to 95° C. in a vacuum oven for periods of 1–5 days. Crosslinking of the samples is evident from solubility measurements. All samples are insoluble in toluene and ethylene dichloride.

EXAMPLE 27

This example illustrates preparation of hybrid copolymers from thermally crosslinked resins of the invention.

A. Copolymers of Styrene and Thermally Crosslinked Vinylbenzyl Chloride

To a 1 liter, 3-necked flask fitted with a mechanical stirrer, reflux condenser, thermometer, nitrogen inlet, heating mantel and thermowatch assembly was charged 500 ml. deionized water, 11.5 g. Amberlite (Trademark) W-1 dispersant and 45.4 g. of a crosslinked polymer (TX-PVBC) substantially as described in Example 1. The charge was followed by the addition of a premix consisting of 73.1 g. styrene, 73.1 g. toluene, 1.4 g. divinylbenzene (54.4%), and 0.7 g. benzoyl peroxide (BPO). The mixture was stirred for 45 minutes and heated to 66° C. for 16 hours, at 78° C. for 3 hours, and finally to 100° C. to remove the toluene via azeotropic distillation. On cooling the hybrid copolymer was washed with water and dried. Weight of hybrid copolymer was 112.6 g. (9.40% Cl).

B. Copolymers of Methyl Acrylate and Thermally Crosslinked Vinylbenzyl Chloride/Copolymer To 1 liter, 3-necked flask fitted with a mechanical stirrer, reflux condenser, thermometer nitrogen inlet, heating mantel, and thermowatch assembly was charged in the following order: 500 ml of deionized water, 40 g. TX-PVBC, 22 g. Amberlite W-1. dispersant and a premixed organic phase consisting of 60 g. methyl acrylate, 3.6 g. divinylbenzene, 20 g toluene, and 0.6 g. benzoyl peroxide. The mixture was stirred for 1 hour under nitrogen to allow the liquid organic phase to be absorbed into the TX-PVBC. Polymerization was effected by heating to 70°–75° C. for 20 hours. Toluene was removed by azeotropic distillation. On cooling, the hybrid copolymer (100.3 g.) was isolated by washing with deionized water, then methanol and drying.

Analysis: % Cl=8.86.

C. Anion Exchange Resin

A 50 g. portion of the hybrid copolymer of Example 27 was added to a 1 liter, 3-necked flask containing 85 g. propylene dichloride and 200 ml. methanol, and the mixture stirred for 30 minutes. Then, and additional 250 ml. methanol and 100 g. dimethylamine were charged and the mixture heated to reflux for 6 hours. On cooling, the resin was washed with methanol and deionized water.

D. Hydrolyzed Form of Anion Exchange Resin

To the resin of Example C was charged 400 g. of a 25% NaOH solution and the mixture heated to reflux over 6 hours. On cooling, the resin was washed with deionized water to a neutral pH. Analysis: % solids=45.2, TAEC (meq./g.)=2.57, strong base (meq./g.)=0.89, AEC (meq./g.)=1.68, CEC (meq./g.)=5.065. ("CEC" means cation exchange capacity).

EXAMPLE 28

This example illustrates recycling during preparation of a thermally crosslinked vinylbenzyl alcohol polymer to optimize bead size uniformity.

A linear polymer prepared as in Example 2 is screened −20 +50 mesh. The over and under screened particles (total about 15%) are dissolved in vinylbenzyl chloride monomer phase in a second linear polymerization carried out according to Example 2. The second polymer is also screened −20 +50 mesh. The over and under screened particles (about 17.5%) can be redissolved in vinybenzyl chloride monomer and used in a subsequent third linear polymerization carried out according to Example 2. The polymerization-screening-dissolving of over/under size particles-polymerization steps can be repeated indefinitely The −20 +50 mesh particles obtained from the first and second polymerizations are then crosslinked thermally be heating to 95° C. over five days to equivalent levels, thus optimizing the yield of uniformly sized beads.

EXAMPLE 29

Part A: Preparation of Thermally Crosslinked Gel Copolymer

An aqueous charge of 950 g. deionized water, 4.4 g. Pharmagel (trademark) gelatin, 1.2 g. boric acid, 0.3 g. sodium nitrite, and 40.0 g. PADMAC dispersant [poly (dialkyldimethyl ammonium chloride)] previously adjusted to pH 10.5 with 50% caustic) was charged to a 3 liter, 4-necked flask fitted with mechanical stirrer, reflux condenser, thermometer, nitrogen inlet, heating mantel, and thermowatch assembly. An organic phase consisting of 3.95 g. benzoyl peroxide dissolved in 790 g. vinylbenzyl chloride (VBC) was added, the nitrogen flow (blanket) started, the stirring rate set at 135 rpm, and the dispersion set by 3 on-off cycles. The mixture was heated to 60° C. and held for 20 hours. On cooling, the polymer beads were washed thoroughly with deionized water and air dried. Yield: 776 g. The polymer was completely soluble in ethylene dichloride (EDC). A 250 g. portion of the polymer beads was placed in a vacuum oven at 95° C. and heated under vacuum for a period of 48 hours. On cooling, the mass of polymer beads was gently aggitated to form free-flowing beads. The beads did not dissolve in ethylene dichloride or toluene. However, they imbibed vast quantities of the two solvents and became highly swollen.

Part B: Preparation of Macronet Adsorbents

A mixture of 21.0 g. of the thermally crosslinked polymer beads of Part A and 300 ml of ethylene dichloride (EDC) was charged to a 1 liter, 3-necked flask fitted with mechanical stirrer, reflux condenser connected to a water scrubber, thermometer and heating mantel, and was stirred one hour during which time the polymer beads became swollen. Then 40 g. stannic chloride in 50 ml EDC was added, the mixture stirred one hour at ambient temperature (about 20° C.), and heated to reflux (83° C.) for 5.5 hours. On cooling, the reaction mixture was quenched by the dropwise addition of acetone (300 ml) while cooling externally in a tap water bath. The resulting macronet polymer beads were washed three times with 200 ml portions of acetone, three times with 200 ml portions of water, and three times with 200 ml portions of acetone. After air drying, the polymer beads were oven dried at 80° C. overnight. Polymer weight=16.5 g. % Chlorine=7.53. Surface area=968.5 m$^2$/g. Porosity=0.6464 cc/cc.

EXAMPLE 30

Part A: Preparation of Thermally Crosslinked Gel Copolymer

Am aqueous charge of 950 g. deionized water, 4.4 g. Pharmagel, 1.2 g. boric acid, 0.3 g. sodium nitrite, and 40.0 PADMAC was introduced into a 3 liter, 4-necked flask fitted with mechanical stirrer, reflux condenser, thermometer, nitrogen inlet, heating mantel, and thermowatch assembly. An organic phase consisting of 7.9 g. benzoyl peroxide dissolved in 790 g. vinylbenzyl chloride was added, nitrogen flow (blanket) started, stirring rate set at 150 rpm, and the dispersion set by 3 on-off cycles. The mixture was heated to 60° C. and held for 20 hours. On cooling, the polymer beads were washed thoroughly with deionized water and air dried. Yield: 781 g. The polymer was completely soluble in ethylene dichloride. A 150 g. portion of the polymer beads was placed in a vacuum oven at 95° C. and heated under vacuum for 48 hours. On cooling, the lightly agglomerated beads were readily broken apart. The polymer beads had become crosslinked as evidenced by lack of solubility in either ethylene dichloride or toluene; however, the polymer did imbibe vast quantities of both solvents and became highly swollen.

Part B: Preparation of Macronet Adsorbents

Substantially as described in Part B of Example 1, a polyamine containing both primary and secondary amino groups. These amines provide secondary crosslinking as well as anion ion exchange properties.

TABLE IV

| Ex. | Amine (g.) | Solvent (g.) | Swelling Time (hr) | Temp. (°C.) | Reaction Time (hr) | Yield (%) | Cl (%) | N (%) | Surface area (m²/g) | Porosity (cc/cc) | Capacities (meq.g.) TAEC | SBC[1] | WBC[2] |
|---|---|---|---|---|---|---|---|---|---|---|---|---|---|
| 32 | piperazine (8.6) | toluene (350) | 1.0 | R.T. 110 | 1.0 5.5 | 36.4 | 9.06 | 3.87 | 25.5 | 0.0370 | — | | |
| 33 | piperazine (8.6) | ethylene glycol (300) | — | 100–110 | 10.0 | 36.3 | 12.76 | 2.77 | 32.9 | 0.3329 | 1.79 | 1.3 | 0.66 |
| 34 | xylene diamine (20.0) | ethylene glycol (400) | — | 110–120 | 20.0 | 33.1 | 19.67 | 0.29 | 16.8 | — | — | | |
| 35 | diethylene triamine (15.45) | ethylene glycol (300) | — | 110–120 | 19.0 | 40.2 | 16.19 | 0.99 | 26.5 | 0.3080 | 0.7 | 0.67 | 0.03 |

[1] Strong base capacity.
[2] Weak base capacity.

macronet beads were formed from the copolymer beads of Part A of this example. The swelling solvent was a mixture of ethylene dichloride (225 ml.) and isooctane (75 ml). Swelling conditions were 1 hour at room temperature and the mixture containing the swollen beads and stannous chloride was reacted first at room temperature for 2 hours followed by reaction at 50°–60° C. for 4.5 hours. Polymer weight=15.2 g. % Chlorine=10.18. Surface area =642.0 m²/g. Porosity=0.7113 cc/cc.

Example 31

Part A: Preparation of Hybrid Copolymer

A charge of 250 g. of the thermally crosslinked polymer beads of Part A of Example 29, 25.0 g. vinylbenzyl chloride, 25.0 g. toluene, 0.5 g. divinylbenzene (50%), and 0.25 g. benzoyl peroxide was premixed in a 1 liter, 3-necked flask fitted with mechanical stirrer, reflux condenser, thermometer, nitrogen inlet, heating mantel, and thermowatch assembly. A mixture of 12.0 g. Amberlite (trademark) W-1 cationic dispersant in 500 ml. g. deionized water was added, nitrogen flow (blanket) started, and the mixture heated to 65° C. and held for 18 hours under aggitation. The mixture was finally heated to 80° C. and held 2 hours followed by heating to 100° C. with azeotropic removal of toluene. On cooling, the polymer beads were washed thoroughly with deionized water and air dried. Weight of product was 50.5 g. Its surface area and porosity were 23.7 m²/g. and 0.0817 cc/cc., respectively.

Part B: Preparation of Macronet Adsorbent

Macronet beads were formed from the copolymer beads of Part A of this example, all conditions being substantially as described in Part B of Example 1 except that 300 ml. EDC was used to swell the beads and the reaction time for macronet formation was 7.5 hours. Polymer weight=15.6 g. % Chlorine=5.12. Surface area=1169.7 m²/g. Porosity=0.4693 cc/cc.

EXAMPLES 32–35

Table IV summarizes aminolysis reaction conditions and anion exchange resin properties for resins prepared from thermally crosslinked poly(vinylbenzyl chloride) beads (TX-PVBC) essentially as described in Examples 8 and 9. The amount of TX-PVBC used was 30.5 grams. Catalyst for the aminolysis was Na₂CO₃ (10.0 grams). The piperazine is representative of a secondary polyamine, xylene diamine is representative of a primary polyamine, and diethylene triamine as representative of

We claim:

1. An ion exchange resin comprising lightly crosslinked beads of a linear addition polymer, said linear polymer containing repeating units of vinybenzyl alcohol and at least one other alpha,beta-monoethylenically unsaturated monomer different from vinylbenzyl alcohol, wherein the vinylbenzyl alcohol units comprise about 0.5% to about 20% by weight of the linear polymer and the crosslinks comprise alpha-hydroxy benzylic methylene links and/or benzyloxy links between aromatic rings of said vinylbenzyl alcohol units or between said aromatic rings and other active sites in said linear polymer, and wherein said crosslinked beads are functionalized to provide ion exchange properties.

2. The ion exchange resin of claim 1 wherein said crosslinked beads are functionalized to provide anionic exchange properties.

3. A macronet adsorbent comprising crosslinked beads of a linear addition polymer, said linear polymer containing repeating units of vinylbenzyl alcohol and at least one other alpha,beta-monoethylenically unsaturated monomer different from vinylbenzyl alcohol, wherein the vinylbenzyl alcohol units comprise about 0.5% to about 20% by weight of the linear polymer and the crosslinks comprise alpha-hydroxy benzylic methylene links and/or benzyloxy links between aromatic rings of said vinylbenzyl alcohol units or between said aromatic rings and other active sites in said linear polymer, said crosslinked beads being post-crosslinked in a swollen state and (1) a Friedel-Crafts alklyating or acylating agent or (2) a sulfur halide, in the presence of a Friedel-Crafts catalyst.

4. A macronet adsorbent comprising crosslinked beads of a linear addition polymer, said linear polymer containing repeating units of vinylbenzyl alcohol and at least one other alpha,beta-monoethylenically unsaturated monomer different from vinylbenzyl alcohol, wherein the vinylbenzyl alcohol units comprise about 0.5% to about 20% by weight of the linear polymer and the crosslinks comprise alpha-hydroxy benzylic methylene links and/or benzyloxy links between aromatic rings of said vinylbenzyl alcohol units or between said aromatic rings and other active sites in said linear polymer, and wherein the major proportion by weight of the linear polymer comprises vinylbenzyl chloride units, said crosslinked beads, being post-crosslinked in a swollen state with a crosslinker composition selected from (1) a Friedel-Crafts alkylating or acylating agent and a Friedel-Crafts catalyst, (2) a sulfur halide and a Friedel-Crafts catalyst, and (3) a Lewis acid.

5. The macronet adsorbent of claim 4 wherein the crosslinker composition is a Lewis acid.

6. The macronet adsorbent of claim 5 wherein the Lewis acid is a Friedel-Crafts catalyst.

7. The macronet adsorbent of claim 6 wherein the Lewis acid is a sulfonating agent.

8. An ion exchange resin comprising the macronet adsorbent of claim 3 in ion exchange form.

9. An ion exchange resin comprising the macronet adsorbent of claim 4 in ion exchange form.

10. An ion exchange resin comprising the macronet adsorbent of claim 5 in ion exchange form.

11. An ion exchange resin comprising the macronet adsorbent of claim 6 in ion exchange form.

* * * * *